(12) United States Patent
Mukunoki et al.

(10) Patent No.: US 12,266,935 B2
(45) Date of Patent: Apr. 1, 2025

(54) POWER CONVERSION DEVICE (71) Applicant: Mitsubishi Electric Corporation, Tokyo (JP)

(72) Inventors: Kaho Mukunoki, Tokyo (JP); Hiroki Ishihara, Tokyo (JP); Toshiyuki Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/569,604

(22) PCT Filed: Jun. 24, 2021

(86) PCT No.: PCT/JP2021/023950
§ 371 (c)(1),
(2) Date: Dec. 13, 2023

(87) PCT Pub. No.: WO2022/269858
PCT Pub. Date: Dec. 29, 2022

(65) Prior Publication Data
US 2024/0291275 A1 Aug. 29, 2024

(51) Int. Cl.
*H02J 3/18* (2006.01)
*H02J 3/24* (2006.01)
*H02J 3/40* (2006.01)

(52) U.S. Cl.
CPC ............ *H02J 3/1885* (2013.01); *H02J 3/241* (2020.01); *H02J 3/40* (2013.01)

(58) Field of Classification Search
CPC .. H02J 3/1885; H02J 3/241; H02J 3/40; H02J 3/32; H02J 3/381; H02J 3/48; H02M 7/5395; H02M 7/797; H02M 1/0009
See application file for complete search history.

(56) References Cited

U.S. PATENT DOCUMENTS

2011/0188267 A1* 8/2011 Lai ......................... H02M 3/335
363/17
2016/0006338 A1* 1/2016 Sakimoto .......... H02M 7/53875
363/131
2020/0083709 A1* 3/2020 Umezu ..................... H02P 9/00

FOREIGN PATENT DOCUMENTS

| EP | 3780310 A1 | 2/2021 |
| JP | 2019-080476 A | 5/2019 |
| WO | 2019/187411 A1 | 10/2019 |

OTHER PUBLICATIONS

International Search Report and Written Opinion mailed on Aug. 17, 2021, received for PCT Application PCT/JP2021/023950, filed on Jun. 24, 2021, 8 pages including English Translation.

* cited by examiner

*Primary Examiner* — Elim Ortiz
*Assistant Examiner* — Thai H Tran
(74) *Attorney, Agent, or Firm* — XSENSUS LLP (57) ABSTRACT

A power conversion device includes a power converter connected to a power storage element, and a control device. The control device includes a generator simulating unit to generate a voltage command value, and a signal generating unit to generate a control signal for the power converter based on the voltage command value. The generator simulating unit includes a first characteristics simulating unit to generate a first command value by simulating characteristics of a first synchronous generator, a second characteristics simulating unit to generate a second command value by simulating characteristics of a second synchronous generator different from the characteristics of the first synchronous generator, an adder to perform addition of the first command value and the second command value, and a voltage command generating unit to generate the voltage command (Continued)

value, based on an addition result of the first command value and the second command value.

12 Claims, 6 Drawing Sheets

POWER CONVERSION DEVICE

CROSS-REFERENCE TO RELATED APPLICATION

This application is based on PCT filing PCT/JP2021/023950, filed Jun. 24, 2021, the entire contents of which are incorporated herein by reference.

TECHNICAL FIELD

The present disclosure relates to a power conversion device.

BACKGROUND ART

In recent years, many distributed power sources using renewable energy such as photovoltaic power systems have been introduced to power grids. Distributed power sources are often connected to a power grid through a power converter. Therefore, as the number of distributed power sources connected to a power grid increases, the proportion of synchronous power generators connected to the power grid decreases and the inertia energy in the power grid decreases, which increases a change in frequency at a time of load abrupt change. Virtual synchronous machine control has been proposed, which allows a power converter to behave similarly to a synchronous generator and thereby makes up for the decreased inertia energy. The power converter with virtual synchronous machine control is controlled so as to simulate the behavior of a synchronous generator to be simulated being connected to a power grid.

For example, WO2019/187411 (PTL 1) discloses a control device for a distributed power source. The control device calculates a virtual inertia value based on the specifications and operating state of a distributed power source and sets a virtual inertia in a power conversion device based on the virtual inertia value and a request inertia value requested from a grid operator.

CITATION LIST

Patent Literature

PTL 1: WO2019/187411

SUMMARY OF INVENTION

Technical Problem

A plurality of synchronous generators are connected to a power grid and the synchronous generators often have different characteristics. There is a need for improving the stability of the power grid by simulating the characteristics of a plurality of synchronous generators using a power converter. PTL 1 neither teaches nor suggests techniques for such a need.

An object in an aspect of the present disclosure is to provide a power conversion device capable of improving the stability of a power grid by simulating the characteristics of a plurality of synchronous generators.

Solution to Problem

A power conversion device according to an embodiment includes a power converter connected to a power storage element, and a control device to control the power converter. The power converter converts a DC power output from the power storage element into an AC power and outputs the AC power to a power grid. The control device includes a generator simulating unit to generate a voltage command value for the power converter by simulating characteristics of a plurality of synchronous generators, and a signal generating unit to generate a control signal for the power converter, based on the voltage command value generated by the generator simulating unit. The generator simulating unit includes a first characteristics simulating unit to generate a first command value by simulating characteristics of a first synchronous generator, a second characteristics simulating unit to generate a second command value by simulating characteristics of a second synchronous generator different from the characteristics of the first synchronous generator, an adder to perform addition of the first command value and the second command value, and a voltage command generating unit to generate the voltage command value, based on an addition result of the first command value and the second command value.

Advantageous Effects of Invention

According to the present disclosure, the stability of a power grid can be improved by simulating the characteristics of a plurality of synchronous generators.

DESCRIPTION OF EMBODIMENTS

Embodiments will be described below with reference to the drawings. In the following description, like parts are denoted by like signs. Their names and functions are also the same. A detailed description thereof will not be repeated.

First Embodiment

<Overall Configuration>

Figure 1:
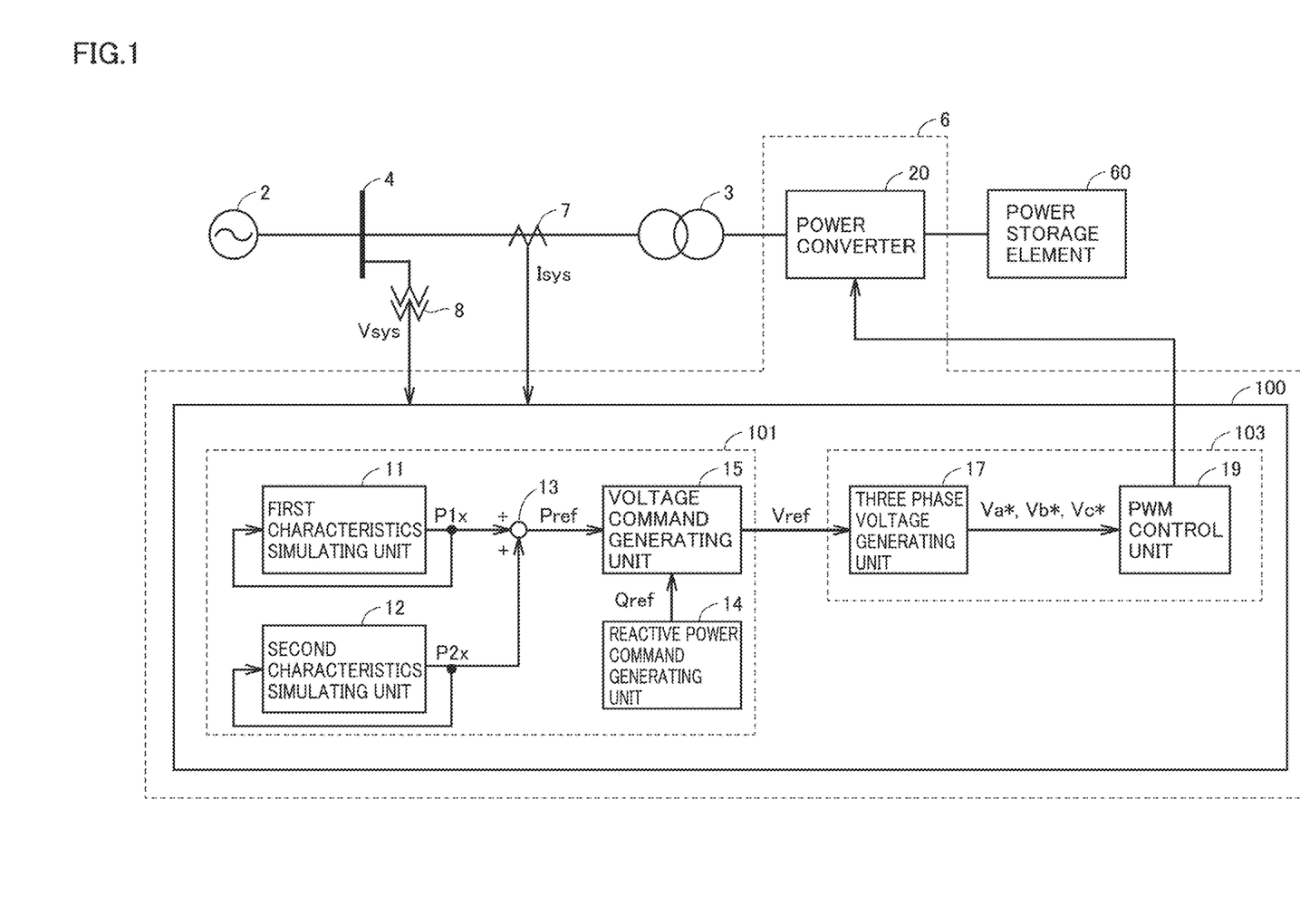
FIG. 1 is a diagram showing an overall configuration of a power conversion system according to a first embodiment.

FIG. 1 is a diagram showing an overall configuration of a power conversion system according to a first embodiment. The power conversion system includes a power grid 2, a transformer 3, a power conversion device 6, a current detector 7, a voltage detector 8, and a power storage element 60. Power grid 2 is, for example, a three phase AC power source. Power conversion device 6 includes a control device 100 and a power converter 20. Power converter 20 is connected to an interconnection point 4 of power grid 2 through transformer 3. Instead of transformer 3, an interconnection reactor may be connected to power converter 20.

Power converter 20 is a power converter connected to power storage element 60 to perform power conversion between power storage element 60 and power grid 2. Specifically, power converter 20 converts a DC power output from power storage element 60 into an AC power and outputs the AC power to power grid 2 through transformer 3. Power converter 20 also converts an AC power from power grid 2 into a DC power and outputs the DC power to power storage element 60. Power converter 20 thus charges and discharges power of power storage element 60. Power converter 20 is, for example, a self-commutated converter such as a two-level converter, a three-level converter, or a modular multilevel converter. Power storage element 60 is, for example, an energy storage element such as an electric double layer capacitor or a secondary battery.

Current detector 7 detects three phase AC current at interconnection point 4 of power grid 2. Specifically, current detector 7 detects an a-phase AC current Ia, a b-phase AC current Ib, and a c-phase AC current Ic flowing between interconnection point 4 and power converter 20. AC currents Ia, Ib, and Ic are input to control device 100. Hereinafter AC currents Ia, Ib, and Ic may be collectively referred to as AC current Isys.

Voltage detector 8 detects three phase AC voltage at interconnection point 4 of power grid 2. Specifically, voltage detector 8 detects an a-phase AC voltage Va, a b-phase AC voltage Vb, and a c-phase AC voltage Vc at interconnection point 4. AC voltages Va, Vb, and Vc are input to control device 100. Hereinafter AC voltages Va, Vb, and Vc may be collectively referred to as AC voltage Vsys.

Control device 100 is a device that controls the operation of power converter 20. Specifically, control device 100 includes, as a main functional configuration, a generator simulating unit 101 and a signal generating unit 103. The functions of generator simulating unit 101 and signal generating unit 103 are implemented by a processing circuit. The processing circuit may be dedicated hardware or may be a CPU that executes a program stored in an internal memory of control device 100. When the processing circuit is dedicated hardware, the processing circuit is configured with, for example, an FPGA, an ASIC, or a combination thereof.

Generator simulating unit 101 generates a voltage command value for power converter 20 by simulating the characteristics of a plurality of synchronous generators based on AC voltage Vsys and AC current Isys at interconnection point 4. Specifically, generator simulating unit 101 includes a first characteristics simulating unit 11, a second characteristics simulating unit 12, an adder 13, a reactive power command generating unit 14, and a voltage command generating unit 15.

First characteristics simulating unit 11 simulates characteristics of a first synchronous generator to output an active power command value P1$x$ indicating a target value of active power to be output to simulate the characteristics. Second characteristics simulating unit 12 simulates characteristics of a second synchronous generator different from the characteristics of the first synchronous generator to output an active power command value P2$x$ indicating a target value of active power to be output to simulate the characteristics. A specific configuration of first characteristics simulating unit 11 and second characteristics simulating unit 12 will be described later. Hereinafter first characteristics simulating unit 11 and second characteristics simulating unit 12 may be collectively referred to as "characteristics simulating unit 10".

Adder 13 adds active power command value P1$x$ and active power command value P2$x$ to generate an active power command value Pref (=P1$x$+P2$x$) as the addition result. Active power command value Pref is a target value of active power to be output by power converter 20 in order to simulate both of the characteristics of the first synchronous generator and the characteristics of the second synchronous generator.

Reactive power command generating unit 14 performs automatic AC voltage regulation for bringing a detection value of AC voltage Vsysy to a rated value, based on a detection value of AC voltage Vsys. In addition, reactive power command generating unit 14 performs automatic reactive power regulation for bringing a reactive power measurement value to a target value, based on a reactive power measurement value calculated from detection values of AC voltage Vsys and AC current Isys. Reactive power command generating unit 14 generates a reactive power command value Qref by performing automatic AC voltage regulation and automatic reactive power regulation.

Voltage command generating unit 15 generates a voltage command value Vref based on the addition result of adder 13 (that is, active power command value Pref). Specifically, voltage command generating unit 15 calculates an active current component and a reactive current component by variable transformation of detection values of three phase AC current Isys. Further, voltage command generating unit 15 calculates an active voltage component and a reactive voltage component by variable transformation of detection values of three phase AC voltage Vsys. Voltage command generating unit 15 generates voltage command value Vref of each phase of power converter 20 such that an active power is output in accordance with active power command value Pref and a reactive power is output in accordance with reactive power command value Qref, based on the active current component, the reactive current component, the active voltage component, and the reactive voltage component.

Signal generating unit 103 generates a control signal for power converter 20, based on voltage command value Vref generated by generator simulating unit 101, and outputs the generated control signal to power converter 20. Specifically, signal generating unit 103 includes a three phase voltage generating unit 17 and a pulse width modulation (PWM) control unit 19.

Three phase voltage generating unit 17 generates three phase sinusoidal voltages Va*, Vb*, and Vc* based on the absolute value |Vref| and the phase θref of voltage command value Vref. Specifically, Va*=|Vref|×sin(θref), Vb*=|Vref|×sin(θref+2π/3), and Vc*=|Vref|×sin(θref+4π/3) are generated.

PWM control unit 19 performs pulse width modulation for each of three phase sinusoidal voltages Va*, Vb*, and Vc* and generates a control signal as a PWM signal. PWM control unit 19 outputs the control signal to power converter 20. Typically, the control signal is a gate control signal for controlling the on/off of each switching element included in power converter 20.

<Hardware Configuration>

Figure 2:
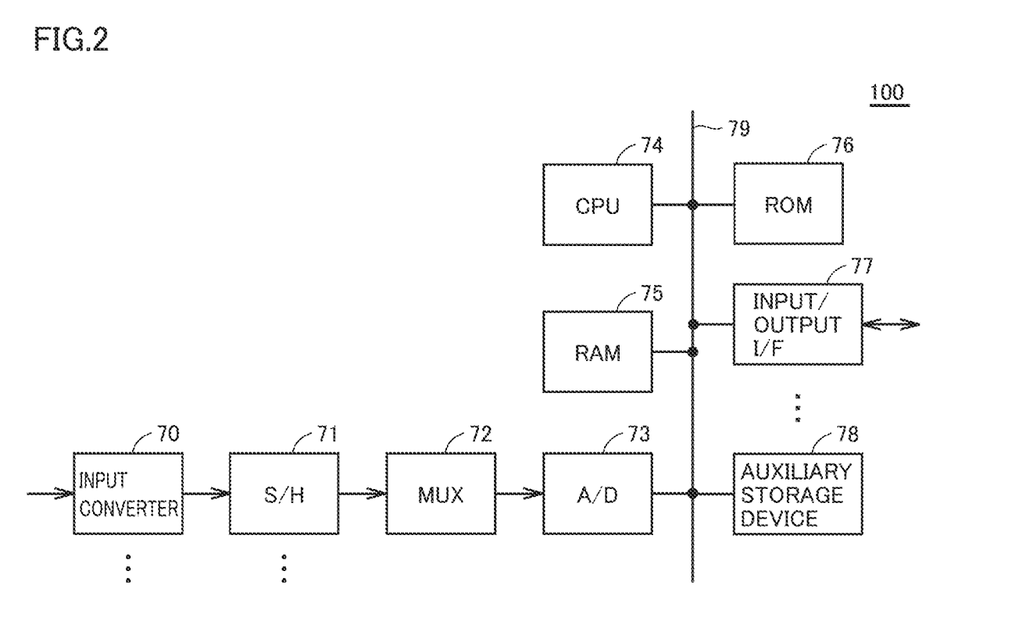
FIG. 2 is a diagram showing a hardware configuration example of a control device.

FIG. 2 is a diagram showing a hardware configuration example of control device 100. FIG. 2 shows an example in which control device 100 is configured with a computer.

Referring to FIG. 2, control device 100 includes one or more input converters 70, one or more sample and hold (S/H) circuits 71, a multiplexer (MUX) 72, an A/D converter 73, one or more central processing units (CPU) 74, a random access memory (RAM) 75, a read only memory (ROM) 76, one or more input/output interfaces 77, and an auxiliary storage device 78. Control device 100 also includes a bus 79 connecting the components to each other.

Input converter 70 has an auxiliary transformer for each input channel. Each auxiliary transformer converts a detection signal by current detector 7 and voltage detector 8 in FIG. 1 into a signal with a voltage level suitable for the subsequent signal processing.

Sample and hold circuit 71 is provided for each input converter 70. Sample and hold circuit 71 samples and holds a signal indicating the electrical quantity received from the corresponding input converter 70 at a preset sampling frequency.

Multiplexer 72 sequentially selects signals held by a plurality of sample and hold circuits 71. A/D converter 73 converts a signal selected by multiplexer 72 into a digital value. A plurality of A/D converters 73 may be provided to perform A/D conversion for detection signals of a plurality of input channels in parallel.

CPU 74 controls the entire control device 100 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example of FIG. 2, at least a part of control device 100 may be configured using circuitry such as a field programmable gate array (FPGA) and an application specific integrated circuit (ASIC).

<Configuration of Characteristics Simulating Unit>

Figure 3:
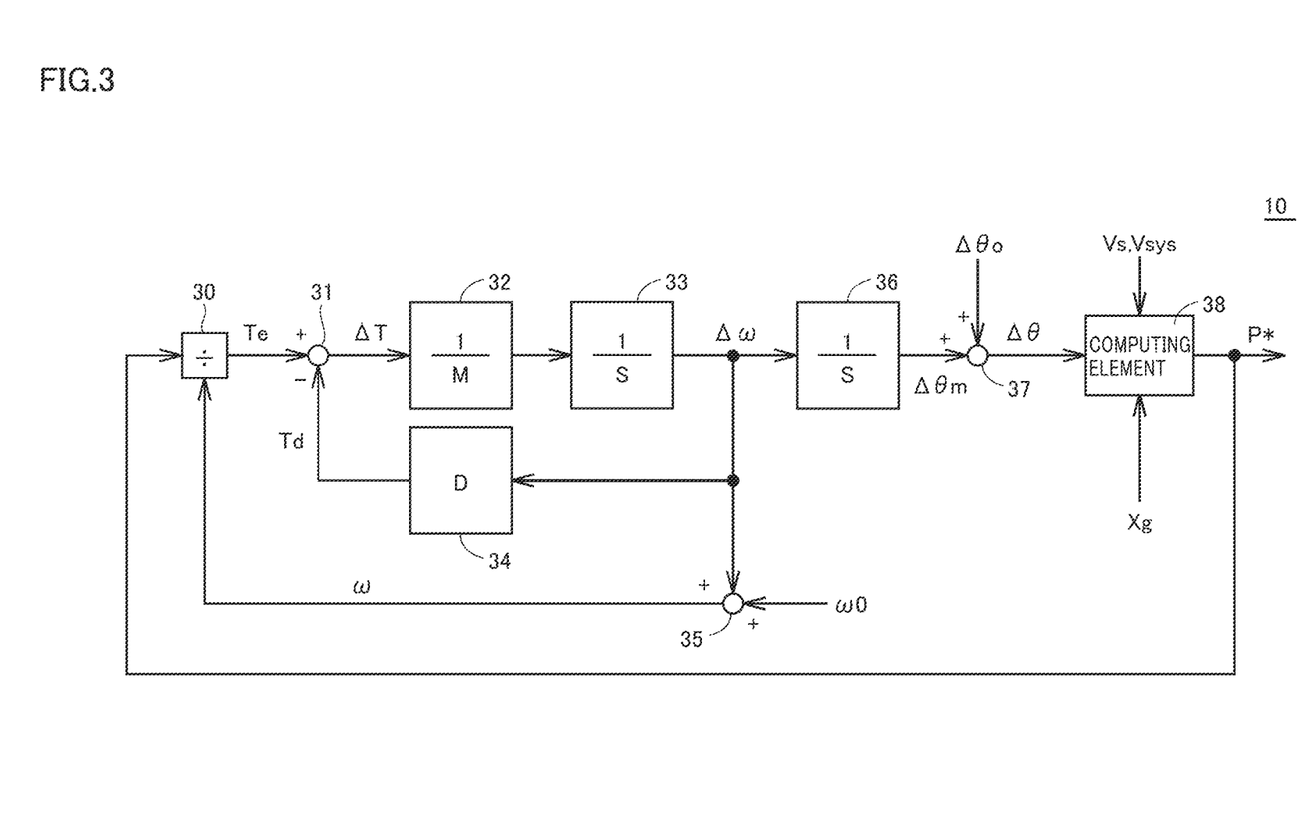
FIG. 3 is a block diagram showing a specific functional configuration of a characteristics simulating unit according to the first embodiment.

FIG. 3 is a block diagram showing a specific functional configuration of the characteristics simulating unit according to the first embodiment. Referring to FIG. 3, characteristics simulating unit 10 includes a divider 30, a subtractor 31, proportional elements 32 and 34, integrators 33 and 36, adders 35 and 37, and a computing element 38.

Divider 30 calculates a torque output value Te (=Px/ω) by dividing an active power command value Px by angular frequency ω. Subtractor 31 calculates a difference ΔT (=Te−Td) between torque output value Te and damping torque Td. In this way, the damping force of a synchronous generator is simulated in the control of power converter 20. Proportional element 32 multiplies difference ΔT by "1/M". "M" is the moment of inertia (also referred to as inertia constant) of the rotor of the synchronous generator (hereinafter also referred to as "virtual synchronous generator") to be simulated by characteristics simulating unit 10. Active power command value Px corresponds to a target value of active power to be output from power converter 20 to simulate the characteristics equivalent to the synchronous generator.

Integrator 33 outputs angular frequency deviation Δω by integrating the multiplication value of proportional element 32 (that is, ΔT/M) with respect to time. Angular frequency deviation Δω corresponds to the difference between angular frequency ω of the rotor of the virtual synchronous generator and a reference angular frequency ω0 of power grid 2. Reference angular frequency ω0 is the angular frequency of a reference frequency (for example, 50 Hz or 60 Hz) of power in power grid 2. Proportional element 34 calculates damping torque Td by multiplying angular frequency deviation Δω by "D". "D" is a damping coefficient of the virtual synchronous generator. Adder 35 calculates angular frequency ω by adding angular frequency deviation Δω and reference angular frequency ω0.

Integrator 36 outputs a phase deviation Δθm by integrating angular frequency deviation Δω with respect to time. Phase deviation Δθm corresponds to the difference between the phase of AC voltage Vsys at interconnection point 4 and the phase of the rotor of the virtual synchronous generator. Adder 37 calculates a phase deviation Δθ (=Δθm+Δθo) by adding phase deviation Δθm and phase deviation Δθo. Phase deviation 400 corresponds to the difference between the phase of AC voltage Vsys at interconnection point 4 and the reference phase of AC voltage to from power converter 20. Phase deviation Δθ corresponds to the difference between the phase of AC voltage Vsys at interconnection point 4 and the phase of AC voltage to be output from power converter 20.

Computing element 38 calculates active power command value Px, based on power supply voltage Vs of power grid 2, AC voltage Vsys at interconnection point 4, phase deviation Δθ, and inductance Xg of power converter 20. It is assumed that power supply voltage Vs is the rated voltage. Computing element 38 calculates active power command value Px by dividing the multiplication value of power supply voltage Vs, AC voltage Vsys, and phase deviation Δθ (that is, Vs×Vsys×Δθ) by inductance Xg.

First characteristics simulating unit 11 and second characteristics simulating unit 12 each simulate the corresponding synchronous generator, based on the corresponding moment of inertia M and damping coefficient D. Specifically, first characteristics simulating unit 11 generates an active power command value P1x for simulating the characteristics of the first synchronous generator using the moment of inertia M1 and damping coefficient D1. Second characteristics simulating unit 12 generates an active power command value P2x for simulating the characteristics of the second synchronous generator using the moment of inertia M2 and damping coefficient D2. The characteristics of the first synchronous generator are dependent on the values of the moment of inertia M1 and damping coefficient D1, and the characteristics of the second synchronous generator are dependent on the values of the moment of inertia M2 and damping coefficient D2. The moment of inertia M1 is different from the moment of inertia M2. In addition, damping coefficient D1 may be different from damping coefficient D2.

Typically, due to a large inertia and loss, a synchronous generator has a characteristic of suppressing a frequency component due to resonance between the connected power grid and the synchronous generator (for example, frequency component due to the impedance of the power grid, and the moment of inertia and the internal impedance of the synchronous generator). Therefore, when a plurality of synchronous generators with different moments of inertia and internal impedances are connected to the power grid, the frequency component due to resonance between the power grid and each synchronous generator is suppressed. Generator simulating unit 101 according to the first embodiment simulates the characteristics of both of the first synchronous generator and the second synchronous generator. As a result, the frequency component due to resonance between each of the first synchronous generator and the second synchronous generator and power grid 2 is suppressed, thereby improving the stability of the frequency range corresponding to each frequency component.

Second Embodiment

<Overall Configuration>

Figure 4:
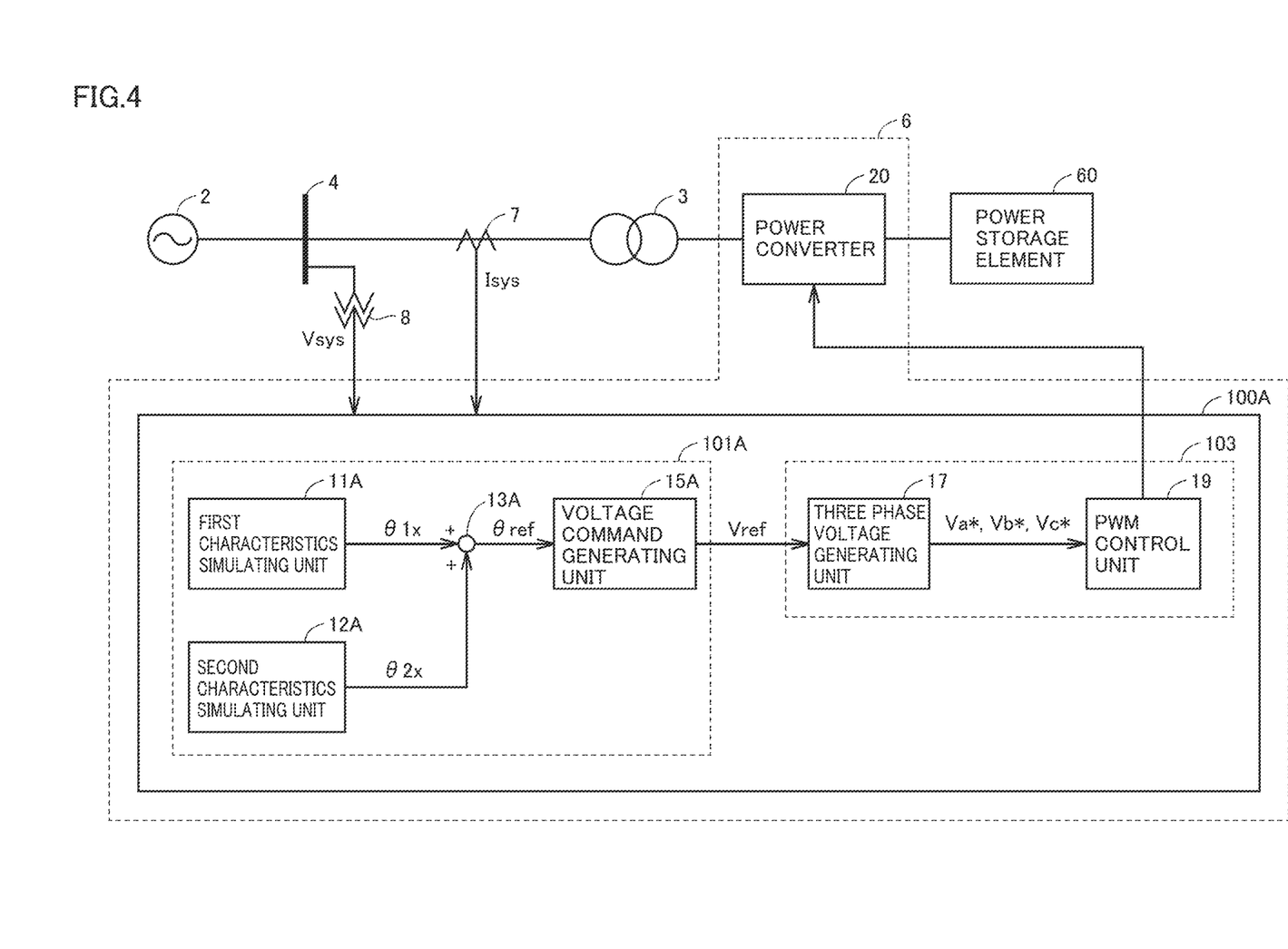
FIG. 4 is a diagram showing an overall configuration of a power conversion system according to a second embodiment.

FIG. 4 is a diagram showing an overall configuration of a power conversion system according to a second embodiment. In the power conversion system in FIG. 4, control device 100 of the power conversion system in FIG. 1 is replaced by a control device 100A. In control device 100A, generator simulating unit 101 of control device 100 is replaced by a generator simulating unit 101A. The configuration is similar to the configuration of FIG. 1 except for generator simulating unit 101A and will not be further elaborated.

Generator simulating unit 101A includes a first characteristics simulating unit 11A, a second characteristics simulating unit 12A, an adder 13A, and a voltage command generating unit 15A.

First characteristics simulating unit 11A simulates characteristics of a first synchronous generator to output a phase command value θ1x indicating a target value of the phase of voltage to be output to simulate the characteristics. Second characteristics simulating unit 12 simulates characteristics of a second synchronous generator to output a phase command value θ2x indicating a target value of the phase of voltage to be output to simulate the characteristics. Hereinafter first characteristics simulating unit 11A and second characteristics simulating unit 12A may be collectively referred to as "characteristics simulating unit 10A".

Adder 13A adds phase command value θ1x and phase command value θ2x to generate a phase command value θref (=θ1x+θ2x) as the addition result. Phase command value θref is a target value of the phase of voltage to be output by power converter 20 to simulate both of the characteristics of the first synchronous generator and the characteristics of the second synchronous generator.

Voltage command generating unit 15A generates a voltage command value Vref for power converter 20, based on the phase in accordance with the addition result of adder 13A (that is, phase command value θref). Specifically, voltage command generating unit 15A sets the absolute value |Vo| of a target value Vo of AC voltage Vsys (hereinafter also referred to as target voltage) as the magnitude of voltage command value Vref (that is, absolute value |Vref|). Furthermore, voltage command generating unit 15A sets phase command value θref as the phase of voltage command value Vref.

As explained in FIG. 1, signal generating unit 103 generates a control signal for power converter 20, based on the absolute value |Vref| and the phase θref of voltage command value Vref generated by generator simulating unit 101, and outputs the generated control signal to power converter 20.

<Configuration of Characteristics Simulating Unit>

Figure 5:
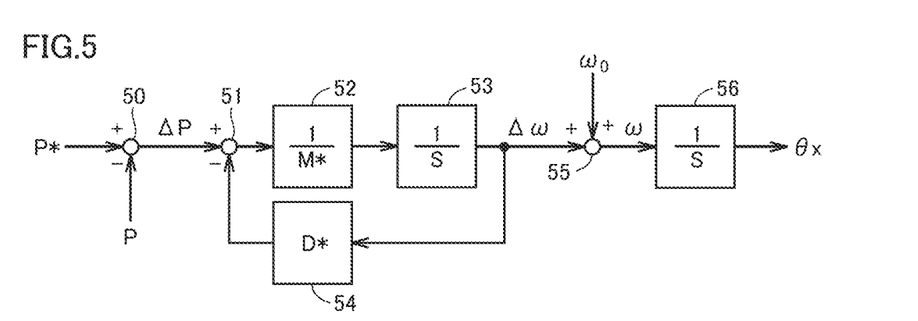
FIG. 5 is a block diagram showing a specific functional configuration of a characteristics simulating unit according to the second embodiment.

FIG. 5 is a block diagram showing a specific functional configuration of a characteristics simulating unit according to the second embodiment. Referring to FIG. 5, characteristics simulating unit 10A includes subtractors 50 and 51, proportional elements 52 and 54, integrators 53 and 56, and an adder 55.

Subtractor 50 calculates a difference ΔP between active power command value Px and active power P. Active power P is an active power at the present time supplied to interconnection point 4 and calculated based on AC current Isys detected by current detector 7 and AC voltage Vsys detected by voltage detector 8. Active power command value Px is set as appropriate by a grid operator.

Subtractor 51 subtracts an output value of proportional element 54 from difference ΔP. The output value of proportional element 54 is the multiplication value "D*×Δω" of angular frequency deviation Δω and damping coefficient D*. The damping force of a synchronous generator is simulated in the control of power converter 20 by subtracting the multiplication value "D*×Δω" from difference ΔP. Proportional element 52 multiplies difference ΔP by "1/M*".

"M*" is the moment of inertia of the rotor of a synchronous generator to be simulated by characteristics simulating unit 10A, and "D*" is the damping coefficient of the synchronous generator. The moment of inertia M and damping coefficient D in FIG. 3 are values used to calculate angular frequency deviation Aw based on torque, and the moment of inertia M* and damping coefficient D* in FIG. 5 are values used to calculate the angular frequency deviation Δω based on active power.

Integrator 53 outputs angular frequency deviation Δω by integrating the multiplication value of proportional element 52 (that is, ΔP/M*) with respect to time. Adder 55 calculates angular frequency ω by adding angular frequency deviation Δω and reference angular frequency ω0. Integrator 56 outputs a phase command value θx by integrating angular frequency ω with respect to time.

First characteristics simulating unit 11A and second characteristics simulating unit 12A each simulate the corresponding synchronous generator, based on the corresponding moment of inertia M* and damping coefficient D*. Specifically, first characteristics simulating unit 11A generates a phase command value θ1x for simulating the characteristics of the first synchronous generator using the moment of inertia M1* and damping coefficient D1*. Second characteristics simulating unit 12 generates a phase command value θ2x for simulating the characteristics of the second synchronous generator using the moment of inertia M2* and damping coefficient D2*. The characteristics of the first synchronous generator are dependent on the values of the moment of inertia M1* and damping coefficient D1*, and the characteristics of the second synchronous generator are dependent on the values of the moment of inertia M2* and damping coefficient D2*. The moment of inertia M1* is different from the moment of inertia M2*. In addition, damping coefficient D1* may be different from damping coefficient D2*.

Generator simulating unit 101A according to the second embodiment simulates the characteristics of both of the first synchronous generator and the second synchronous generator. As a result, the frequency component due to resonance between each of the first synchronous generator and the second synchronous generator and power grid 2 is suppressed, thereby improving the stability of the frequency range corresponding to each frequency component.

Figure 6:
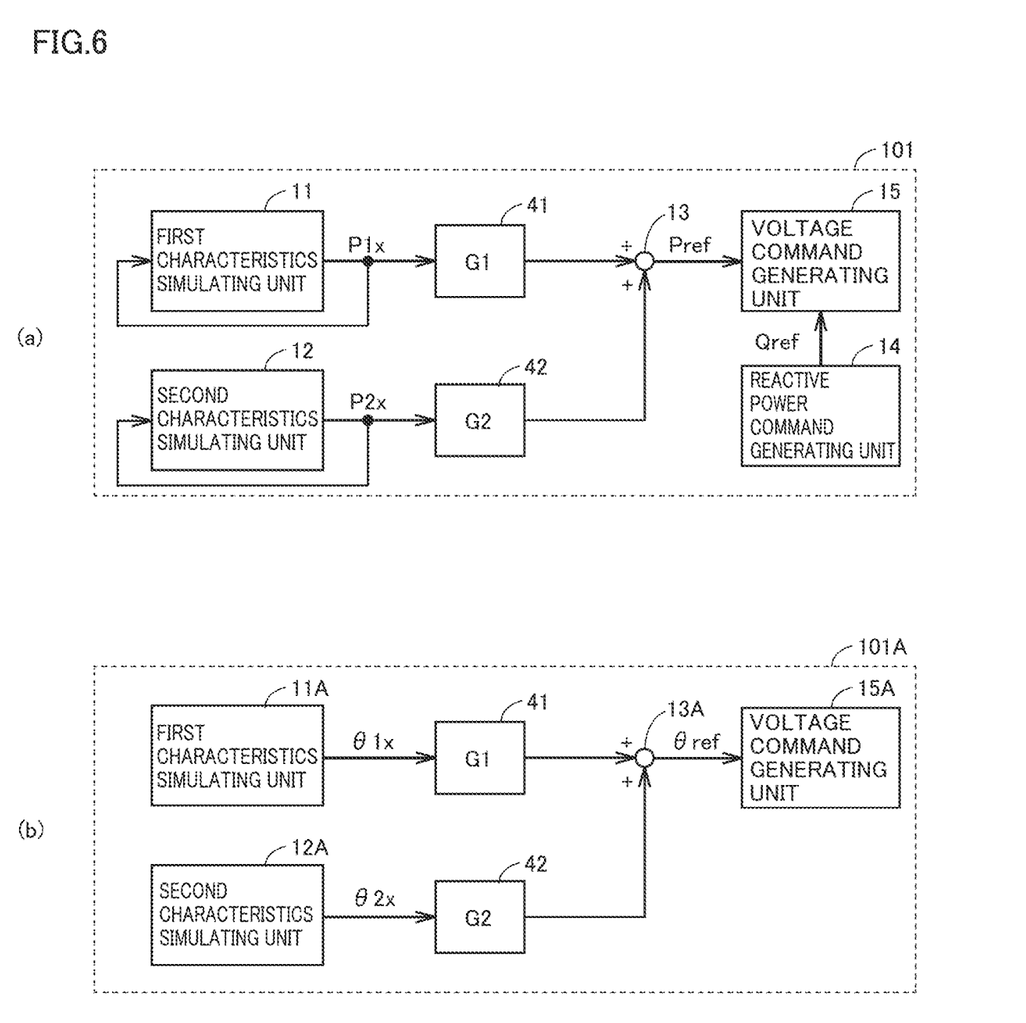
FIG. 6 is a diagram for explaining a modification of a generator simulating unit.

Other Embodiments (1) A modification of generator simulating unit 101 and generator simulating unit 101A will be described. FIG. 6 is a diagram for explaining a modification of a generator simulating unit. Specifically, FIG. 6(a) shows a modification of generator simulating unit 101 according to the first embodiment. FIG. 6(b) shows a modification of generator simulating unit 101A according to the second embodiment.

Referring to FIG. 6(a), compared to the configuration in FIG. 1, a proportional element 41 is added between first characteristics simulating unit 11 and adder 13. Further, a proportional element 42 is added between second characteristics simulating unit 12 and adder 13. With this configuration, adder 13 outputs an active power command value Pref by adding a value obtained by multiplying active power command value P1x by a gain G1 (that is, P1x×G1) and a value obtained by multiplying active power command value P2x by a gain G2 (that is, P2x×G2).

Referring to FIG. 6(b), compared to the configuration in FIG. 4, a proportional element 41 is added between first characteristics simulating unit 11A and adder 13A, and a proportional element 42 is added between second characteristics simulating unit 12A and adder 13A. With this configuration, adder 13A outputs a phase command value θref by adding a value obtained by multiplying phase command value θ1x by a gain G1 (that is, θ1x×G1) and a value obtained by multiplying phase command value θ2x by a gain G2 (that is, θ2x×G2).

By adjusting gains G1 and G2, the oscillation of power grid 2 can be suppressed more effectively. For example, when the oscillation of power grid 2 can be suppressed more by making the moment of inertia of the first synchronous generator larger than the moment of inertia of the second synchronous generator, gain G1 is set to be larger than gain G2. On the other hand, when the oscillation of power grid 2 can be suppressed more by making the moment of inertia of the second synchronous generator larger than the moment of inertia of the first synchronous generator, gain G2 is set to be larger than gain G1.

Specifically, power grid 2 includes a first oscillation frequency component corresponding to the first synchronous generator and a second oscillation frequency component corresponding to the second synchronous generator. The first oscillation frequency component is a frequency component due to resonance between power grid 2 and the first synchronous generator and has a frequency and an amplitude resulting from the impedance of power grid 2 and the moment of inertia and the internal impedance of the first synchronous generator. The second oscillation frequency component is a frequency component due to resonance between the second synchronous generator and power grid 2 and has a frequency and an amplitude resulting from the impedance of power grid 2 and the moment of inertia and the internal impedance of the second synchronous generator.

Gain G1 and gain G2 are set based on the magnitudes (for example, amplitudes) of the first oscillation frequency component and the second oscillation frequency component. For example, when the first oscillation frequency component is larger than the second oscillation frequency component, gain G1 is set to be larger than gain G2 to suppress the oscillation of power grid 2 more effectively. On the other hand, when the second oscillation frequency component is larger than the first oscillation frequency component, gain G2 is set to be larger than gain G1 to suppress the oscillation of power grid 2 more effectively.

(2) In the foregoing embodiments, a configuration in which the generator simulating unit simulates two synchronous generators: a first synchronous generator and a second synchronous generator has been described. However, embodiments are not limited to this configuration. The generator simulating unit may simulate three or more synchronous generators.

(3) The above configurations described as embodiments are examples of the configuration of the present disclosure, can be combined with other known techniques, and are susceptible to modifications such as partial omission without departing from the spirit of the present disclosure. In the foregoing embodiments, the processing and configuration described in other embodiments may be employed and carried out, if necessary.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 2 power grid, 3 transformer, 4 interconnection point, 6 power conversion device, 7 current detector, 8 voltage detector, 10, 10A characteristics simulating unit, 11, 11A first characteristics simulating unit, 12, 12A second characteristics simulating unit, 13, 13A, 35, 37, 55 adder, 14 reactive power command generating unit, 15, 15A voltage command generating unit, 17 three phase voltage generating unit, 19 PWM control unit, 20 power converter, 60 power storage element, 70 input converter, 71 sample and hold circuit, 72 multiplexer, 73 A/D converter, 74 CPU, 75 RAM, 76 ROM, 77 input/output interface, 78 auxiliary storage device, 79 bus, 100, 100A control device, 101, 101A generator simulating unit, 103 signal generating unit.

The invention claimed is:

1. A power conversion device comprising:
a power converter connected to a power storage element; and
a control device to control the power converter, wherein
the power converter converts a DC power output from the power storage element into an AC power and outputs the AC power to a power grid,
the control device includes
  a generator simulating unit to generate a voltage command value for the power converter by simulating characteristics of a plurality of synchronous generators, and
  a signal generating unit to generate a control signal for the power converter, based on the voltage command value generated by the generator simulating unit, and
the generator simulating unit includes
  a first characteristics simulating unit to generate a first command value by simulating characteristics of a first synchronous generator,
  a second characteristics simulating unit to generate a second command value by simulating characteristics of a second synchronous generator different from the characteristics of the first synchronous generator,
  an adder to perform addition of the first command value and the second command value, and
  a voltage command generating unit to generate the voltage command value, based on an addition result of the first command value and the second command value.

2. The power conversion device according to claim 1, wherein
the first characteristics simulating unit outputs a first active power command value as the first command value,
the second characteristics simulating unit outputs a second active power command value as the second command value, and
the voltage command generating unit generates the voltage command value so that an active power in accordance with an addition result of the first active power command value and the second active power command value is output from the power converter.

3. The power conversion device according to claim 2, wherein a first moment of inertia of the first synchronous generator is different from a second moment of inertia of the second synchronous generator.

4. The power conversion device according to claim 2, wherein
the adder adds a value obtained by multiplying the first command value by a first gain and a value obtained by multiplying the second command value by a second gain,
the power grid includes a first oscillation frequency component corresponding to the first synchronous generator and a second oscillation frequency component corresponding to the second synchronous generator, and
the first gain and the second gain are set based on magnitudes of the first oscillation frequency component and the second oscillation frequency component.

5. The power conversion device according to claim 1, wherein
the first characteristics simulating unit outputs a first phase command value as the first command value,
the second characteristics simulating unit outputs a second phase command value as the second command value, and
the voltage command generating unit generates the voltage command value, based on a phase in accordance with an addition result of the first phase command value and the second phase command value.

6. The power conversion device according to claim 5, wherein a first moment of inertia of the first synchronous generator is different from a second moment of inertia of the second synchronous generator.

7. The power conversion device according to claim 5, wherein
the adder adds a value obtained by multiplying the first command value by a first gain and a value obtained by multiplying the second command value by a second gain,
the power grid includes a first oscillation frequency component corresponding to the first synchronous generator and a second oscillation frequency component corresponding to the second synchronous generator, and
the first gain and the second gain are set based on magnitudes of the first oscillation frequency component and the second oscillation frequency component.

8. The power conversion device according to claim 1, wherein a first moment of inertia of the first synchronous generator is different from a second moment of inertia of the second synchronous generator.

9. The power conversion device according to claim 8, wherein a first damping coefficient of the first synchronous generator is different from a second damping coefficient of the second synchronous generator.

10. The power conversion device according to claim 9, wherein
the adder adds a value obtained by multiplying the first command value by a first gain and a value obtained by multiplying the second command value by a second gain,
the power grid includes a first oscillation frequency component corresponding to the first synchronous generator and a second oscillation frequency component corresponding to the second synchronous generator, and
the first gain and the second gain are set based on magnitudes of the first oscillation frequency component and the second oscillation frequency component.

11. The power conversion device according to claim 8, wherein
the adder adds a value obtained by multiplying the first command value by a first gain and a value obtained by multiplying the second command value by a second gain,
the power grid includes a first oscillation frequency component corresponding to the first synchronous generator and a second oscillation frequency component corresponding to the second synchronous generator, and
the first gain and the second gain are set based on magnitudes of the first oscillation frequency component and the second oscillation frequency component.

12. The power conversion device according to claim 1, wherein
the adder adds a value obtained by multiplying the first command value by a first gain and a value obtained by multiplying the second command value by a second gain,
the power grid includes a first oscillation frequency component corresponding to the first synchronous generator and a second oscillation frequency component corresponding to the second synchronous generator, and
the first gain and the second gain are set based on magnitudes of the first oscillation frequency component and the second oscillation frequency component.

* * * * *